T. A. EDISON.
GAS PURIFIER.
APPLICATION FILED MAR. 27, 1909.
930,947.
Patented Aug. 10, 1909.
2 SHEETS—SHEET 1.
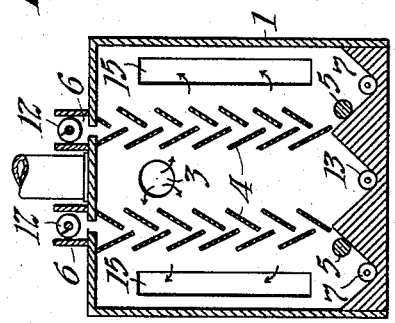
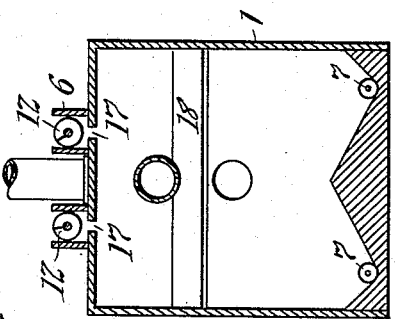
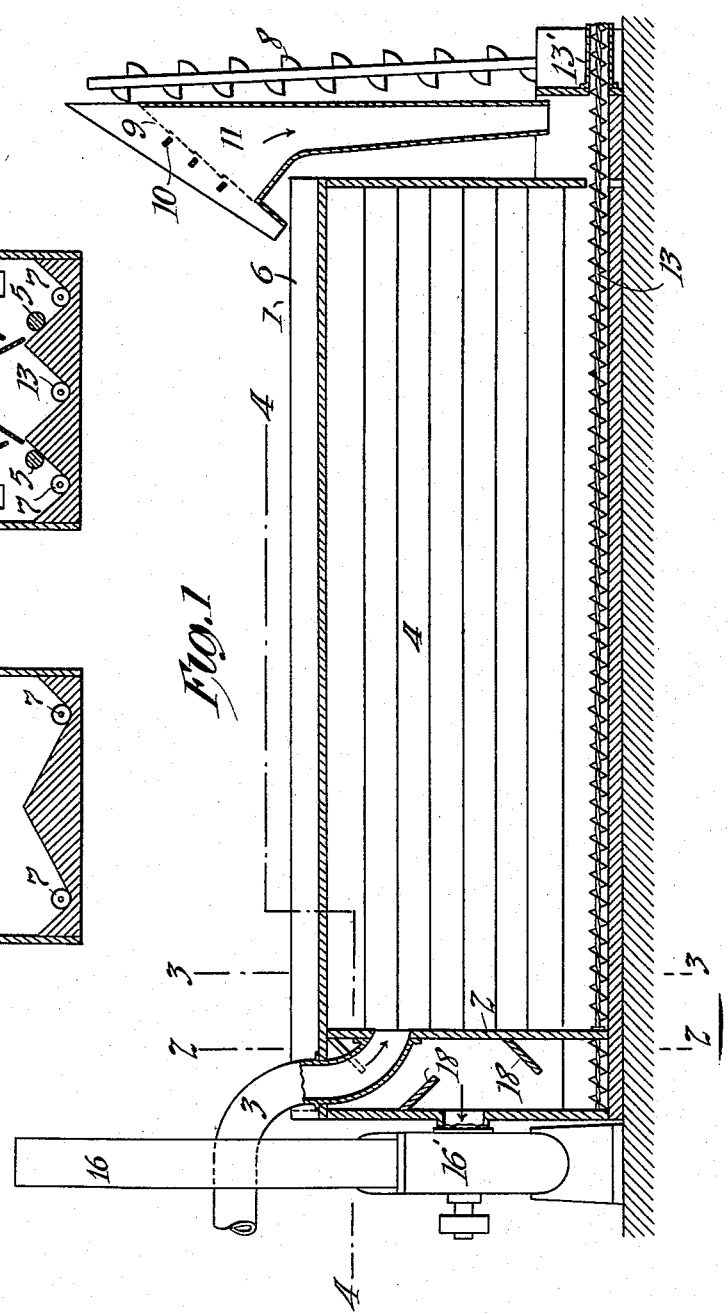
Witnesses:
Frank D. Lewis
Dyer Smith
Inventor:
Thomas A. Edison
by Frank L. Dyer
Atty.

T. A. EDISON.
GAS PURIFIER.
APPLICATION FILED MAR. 27, 1909.
930,947.
Patented Aug. 10, 1909.
2 SHEETS—SHEET 2.
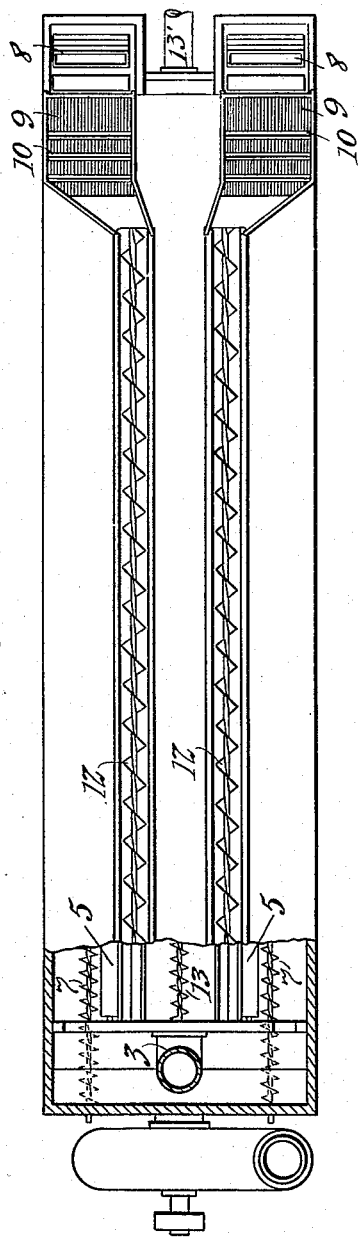
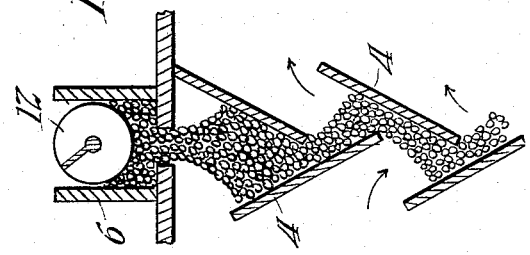
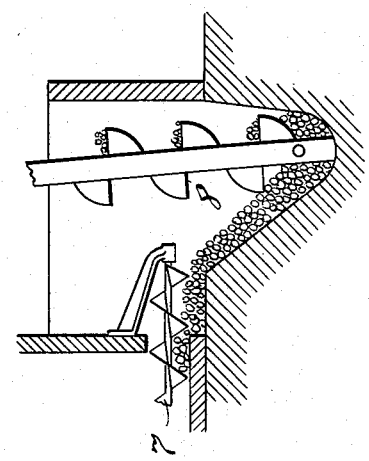

UNITED STATES PATENT OFFICE.

THOMAS A. EDISON, OF LLEWELLYN PARK, WEST ORANGE, NEW JERSEY, ASSIGNOR TO EDISON PORTLAND CEMENT COMPANY, OF STEWARTSVILLE, NEW JERSEY, A CORPORATION OF NEW JERSEY.

GAS-PURIFIER.

No. 930,947.　　　　Specification of Letters Patent.　　　Patented Aug. 10, 1909.

Original application filed October 24, 1906, Serial No. 340,299. Divided and this application filed March 27, 1909. Serial No. 486,204.

*To all whom it may concern:*

Be it known that I, THOMAS A. EDISON, a citizen of the United States, and a resident of Llewellyn Park, West Orange, county of Essex, and State of New Jersey, have made a certain new and useful Improvement in Gas-Purifiers, of which the following is a description.

This application is a division of my application Serial No. 340,299, for apparatus for burning Portland cement, filed October 24, 1906.

In the above entitled case, greater efficiency for a rotary cement kiln was provided for in several ways. One of the features of said application consists in showering the dry, unburned cement material or chalk diametrically across the kiln as the material progresses slowly toward the lower end, so that the very hot products of combustion passing through the kiln will encounter the incoming material in a very effective manner, to thereby heat the same and drive off water and carbon dioxid, whereby the products of combustion may be caused to give up a very large proportion of their heat. With a procedure such as this, there would be a prohibitively large loss of chalk with the escaping gases unless provision were made to recover the same, and for this purpose an improved settling chamber and filter were described in the application above referred to, in which substantially all of the solid matter escaping with the products of combustion will be separated therefrom, so that no loss from this cause will be experienced. Such a settling chamber and filter might conveniently be used with any rotary kiln in which the dry process is employed, because even when the chalk is fed along the bottom of the kiln in the old way, considerable quantities of it are sucked up by the gases and escape through the stack. The settling chamber and filter above referred to and described in application No. 340,299 in connection with the rotary kiln there described, are, in this application, described and claimed separately. It will be obvious from the following description that this filter may be useful in connection with various sources of hot gases which should be filtered and purified, and not merely in connection with a rotary cement kiln, although in such an application it is particularly efficacious.
A settling chamber and filter suitable for use in combination or connection with a rotary kiln should have as a most important consideration, a fixed and constant porosity, to thereby present an absolutely uniform resistance to the draft passing through it, so as not to disturb the correct operation within the kiln itself, since variations in the draft seriously affect the character and quality of the resulting clinker. Such a settling chamber and filter should also be capable of being effectively cleaned to permit the separated chalk to be recovered and it should also be of such construction as not to be affected by the high temperatures encountered in its use. To this end, the improved settling chamber and filter which I have invented and which I propose to herein claim, comprises a suitable chamber having one or more walls or partitions through which the draft passes, formed of pulverulent or granular material, presenting innumerable minute tortuous channels, through which the products of combustion find their way, and by which the chalk or other solid matter carried therewith, will be separated. Provision is made for effecting a slow movement either continuous or intermittent, of the granular material constituting the filtering medium, so that the filtering medium is constantly undergoing change, to permit that portion of the chalk deposited within the same to be separated therefrom, as I will hereinafter describe and claim. By thus continuously changing the filtering medium it cannot become clogged by the accumulation of the fine material or chalk therein so that its porosity remains unaltered and consequently its resistance to the draft will be always constant so as not to affect the conditions within the kiln or other source of the hot gases with which it is designed to coöperate. In addition to the filtering medium, I also provide a settling chamber of sufficient capacity to permit the velocity of the draft to be very greatly reduced, so that the larger bulk of chalk or dust will be separated by gravity. The chalk so separated from the draft may be returned directly to the kiln or passed to a suitable stock house, as is described in application 340,299. The filtering medium which I employ is any suitable relatively coarse material, whose particles may range conveniently between 1/16 and 1/8 of an inch, such as coarse sand or coarsely pulverized cement rock. This material is caused to assume the form of a substantially vertical screen or partition, through which the draft passes as explained, and which is kept in constant, though very slow movement, material being added at the top as material is drawn off at the bottom, carrying the separated dust or chalk with it. The filtering material thus drawn off is passed to a screening device by which the fine chalk is separated, while all coarse material is again returned for use in the filtering apparatus. Thus, a substantially constant load of coarse filtering material is maintained in transit from the bottom of the filter through the screening device, and thence to the upper end of the filter all as I will fully hereinafter describe and claim.

The object of my invention, accordingly, is to provide an improved purifying or filtering device for gases, the same being of constant porosity and adapted particularly for use in combination with a cement kiln but capable of use in other connections, and by which a uniform resistance will at all times be imposed to the passage of a draft through it, thereby effecting the separation of any solid dust-like particles carried by the draft, the filtering medium being continuously or intermittently replenished without affecting the passage of the draft through the same, thereby permitting the separated dust-like material to be recovered, if desired.

In order that the invention may be better understood, attention is directed to the accompanying drawings, forming part of this specification, and in which—

Figure 1 is a longitudinal sectional view of my improved filter or purifying device. Fig. 2 is a section on line 2—2 of Fig. 1. Fig. 3 is a cross-sectional view on the line 3—3 of Fig. 1. Fig. 4 is a plan and horizontal sectional view on the line 4—4 of Fig. 1. Fig. 5 is an end view showing a detail of the lower end of one of the elevators and a conveyer leading into the same. Fig. 6 is an enlarged detail sectional view showing part of one of the filter walls.

In all of the above views corresponding parts are represented by the same reference characters.

Referring to the drawings, the settling chamber and filter 1 comprises generally a rectangular structure whose walls may be conveniently built of firebrick or cement. Near the front of the filter is the wall 2 through which passes a flue 3, which constitutes an entrance to the filter for the products of combustion from the cement kiln, or the hot gases from whatever source is used in connection with the filter. These gases will be directed into the central part of the filter, as shown. Extending longitudinally of the filter between the wall 2 and the rear wall are two vertical sets of plates 4 inclined at a very acute angle, as is shown in Figs. 3 and 6, and made preferably of firebrick or cement. Each set of plates 4 is preferably composed of plates of opposite inclination, the plates or shelves of opposite inclination being in staggered relation, that is, the shelves of one inclination being placed opposite the spaces between the shelves of opposite inclination. I supply to the two sets of plates a load of relatively coarse material, constituting a screening or filtering medium, and which may be composed of coarse sand or gravel or coarsely ground cement rock, the particles ranging preferably between 1/16 to 1/8 of an inch in size, the thickness of the body of coarse material being about one and one-half inches. The filtering material will accumulate between the inclined shelves so as to form a substantially vertical filter presenting innumerable fine interstices and tortuous channels, through which the draft may pass and in which any fine dust or chalk may settle. The filtering material in each filtering partition is kept very slowly in movement by means of a roller feed 5 below the lower end of each partition, and operated in any suitable way, fresh material being supplied to the upper end of each filtering wall or partition from an extended trough 6 above the same. The coarse granular filtering material drawn off at the bottom of each partition and carrying with it the load of separated dust or chalk is deposited by the roller feed 5 onto a conveyer 7 of any suitable type, and by which it is conducted to an elevator 8, as is shown in Fig. 5. The object of the rollers 5 is to retard and regulate the speed of progression of the granular material from the filtering walls onto the conveyers 7. The material is elevated by the elevator 8 and deposited upon a series of screens 9 provided with checking shelves 10, so as to prevent the material from passing too rapidly over the screens. By means of the screens 9, the fine dust or chalk will fall into a chute 11, while the coarse materials will be returned to the hoppers 6 and be distributed through the latter by conveyers 12. The presence of the coarse material intermixed with fine dust or chalk will very materially facilitate the effective screening of the latter. From the chute 11, the fine chalk is deposited in the path of the conveyer 13, which removes it from the filter, and which in case the filter is used in connection with a cement kiln, would preferably lead to a suitable stock house or other means for containing chalk. The conveyer 13 is protected by the pipe 13' in its passage outside the filter.

The conveyer 13 extends longitudinally of the main portion of the filter between the two filtering partitions. This portion of the filter is formed with an inclined bottom, as shown in Fig. 3, and constitutes a settling chamber of a sufficient size to arrest the velocity of the products of combustion passing therethrough so that a very large proportion of dust or chalk carried therewith will deposit by gravity in this settling chamber and be carried off by the conveyer 13. The gases escape from this central settling chamber by passing through the filtering walls, after which they escape through two vertical openings 15 in the wall 2. The stack 16 may be provided and also the blower 16' connected thereto, if desired, to facilitate the escape of these gases.

As is shown in the drawings, the hoppers 6 extend beyond the partition 2, and are formed with openings 17, therein, so that any surplus of coarse material will be deposited in the path of the conveyers 7, and thence kept in transit over the screens 9, and back to the hoppers. In this way, I insure a constant supply of material to the filtering walls, so that a uniform load of coarse material will always be in position on the inclined shelves 4 of the filtering walls. This is of the utmost importance when the device is used in connection with a rotary kiln, because thereby I am enabled to keep the porosity and resistance of the filtering device absolutely uniform, so that, as has been stated, no disturbance of the operation of the kiln or other device furnishing the gases to be filtered, will result. Preferably, checking shelves 18 are arranged in the chamber formed between the front walls of the device, to check the coarse material falling from the openings 17 onto the conveyers 7.

In operation, the products of combustion pass from the settling chamber slowly through the channels presented by the granular filtering material interposed between the inclined plates 4, the area presented by the filtering material being very extensive and permitting the products of combustion to seep with relative slowness through the filtering walls. By thus causing the products of combustion to pass through the fine channels presented within the filtering material, any excessively fine dust-like particles carried by the gases and which were not deposited in the settling chamber will be effectively separated and retained within the filtering material on account of the slow movement of the gaseous currents in the channels, and also because the channels are so tortuous that the dust-like particles must in many cases be lifted up against gravity, which the slow movements of the gaseous currents are unable to effect. Preferably, I maintain the load of coarse particles in constant but very slow movement. A movement sufficient to effect a complete change of the filtering wall in one hour will be sufficiently rapid for the purpose. Although the filtering material is thus in constant movement, the resistance offered by the filtering walls remains constant.

The gas filter herein described and claimed, is adapted, as will be evident, for use with various sources of hot gases, such as the apparatus for burning Portland cement, as is disclosed in my application Serial No. 340,299, of which this case is a division; Serial No. 345,041, filed November 26, 1906 and Serial No. 345,042, filed November 26, 1906, wherein are set forth specific applications of the filter comprising the generic invention herein described and claimed, and for use in connection with various other devices.

It will of course, be obvious that I am not limited in the invention here disclosed to the exact devices or construction here described, except as the same are embodied in the claims.

Having now described my invention, what I claim and desire to protect by Letters Patent of the United States is as follows:

1. An improved filter for removing solid or dust-like particles from gaseous currents, comprising shelves oppositely inclined and facing each other with an acute angle between the inner faces of the same, and granular filtering material contained between said shelves, the shelves constituting the only lateral retaining means for the granular filtering material and being arranged in staggered relation with the plane of each intersecting the next lower oppositely inclined shelf, substantially as described.

2. An improved filter for removing solid or dust-like particles from gaseous currents, comprising shelves oppositely inclined and facing each other, and granular filtering material contained between said shelves, the shelves constituting the only lateral retaining means for the granular filtering material and being arranged in staggered relation with the plane of each intersecting the next lower oppositely inclined shelf, means for uniformly feeding granular material between said shelves, and removing it therefrom, substantially as described.

3. An improved filter for removing solid or dust-like particles from gaseous currents, comprising filter walls, means for leading gases into the space between the walls, the said filtering walls comprising oppositely inclined facing shelves, the shelves of one inclination facing the openings between the shelves of the opposite inclination, and means for feeding granular material between the shelves, substantially as described.

4. An improved filter for removing solid or dust-like particles from gaseous currents, comprising walls of granular material, means for admitting the gas between the said walls, a settling chamber between the said walls, a conveyer for removing settlings from the settling chamber, means for uniformly progressing the granular material of the filtering walls therethrough, and conveyers for removing the said material and dust carried thereby after its passage from between said walls, the bottom of the filter being formed within the settling chamber to direct settlings deposited therein to the said settlings removing conveyer, and formed outside the settling chamber to direct the granular material laterally from the bottoms of the filtering walls to the conveyers for removing the same, one laterally beyond each wall, substantially as described.

5. An improved filter for removing solid or dust-like particles from gaseous currents, comprising walls of granular material, means for admitting the gases between said walls, a settling chamber between said walls, said walls comprising oppositely inclined shelves between which the granular material is supported, means for uniformly progressing the granular material of the filtering walls means for removing the said material after its passage from between the said walls, means for directing it to said removing means, and means for removing settlings from the settling chamber, substantially as described.

6. An improved filter for removing solid or dust-like particles from gaseous currents, comprising walls of granular material, means for admitting the gases between said walls, and a settling chamber between said walls, said walls comprising oppositely inclined shelves in staggered relation between which the granular material is supported, substantially as described.

7. An improved filter for removing solid or dust-like particles from gaseous currents, comprising walls of granular material, means for admitting gases between said walls, a settling chamber between the said walls, said walls comprising oppositely inclined shelves in staggered relation, between which the granular material is supported, means for removing settlings from the said chamber, and means for uniformly progressing the granular material of the filtering walls, substantially as described.

8. An improved filter for removing solid or dust-like particles from gaseous currents, comprising a settling chamber closed at the ends and of sufficient size to arrest the velocity of the gaseous currents passing therethrough, walls of granular material constituting the sides of said chamber, means for admitting the gases between said walls, a conveyer for removing settlings from said chamber, said chamber having an inclined surface directing settlings to said conveyer, means for progressing the granular material of the filtering walls therethrough continuously, the bottom of said filter being provided with inclined surfaces for directing the said material and dust carried thereby from the lower ends of said walls laterally to the outer sides of said walls, and conveyers on the outer sides of said walls for removing the said material and dust carried thereby after the exit of the same from the lower ends of said walls, substantially as described.

This specification signed and witnessed this 15th day of February 1909.

THOS. A. EDISON.

Witnesses:
 DYER SMITH,
 JOHN M. CANFIELD.